Dec. 9, 1958 J. R. HARCLERODE 2,863,440
MASONRY SAW

Filed May 14, 1956 3 Sheets-Sheet 1

INVENTOR.
John Robert Harclerode
BY
ATTORNEY.

Dec. 9, 1958 J. R. HARCLERODE 2,863,440
MASONRY SAW
Filed May 14, 1956 3 Sheets-Sheet 2

INVENTOR.
John Robert Harclerode
BY
ATTORNEY.

INVENTOR.
John Robert Harclerode
BY
ATTORNEY.

United States Patent Office 2,863,440
Patented Dec. 9, 1958

2,863,440

MASONRY SAW

John Robert Harclerode, Kansas City, Mo., assignor to Clipper Manufacturing Company, Kansas City, Mo., a corporation of Missouri Application May 14, 1956, Serial No. 584,702

17 Claims. (Cl. 125—13)

This invention relates to improvements in material cutting machines, and more particularly masonry saws, the primary object being to provide structure having manually operable parts for easily, readily and minutely raising and lowering the cutter assembly forming a part of the machine to vary the distance of the cutting tool from a work table that supports the material to be cut.

It is the most important object of the present invention to provide a masonry saw having a cutter swingable toward and away from a work table and swingably mounted on vertically reciprocable support means to the end that the depth of cut in the material carried by the work table may be quickly varied by the operator through the simple expedient of manipulating an adjusting wheel or other similar actuating structure.

Another important object of the instant invention is the provision of a masonry saw swingably mounted on raising and lowering structure and having mechanism for swinging the same that is in turn mounted on said structure to the end that the swinging operation may be carried out at any of the various heights to which the cutter assembly may be adjusted and to the end further that such mechanism will have no effect tending to offset the adjustment of the cutter assembly through the manually controlled raising and lowering structure.

Another important object of the instant invention is the provision of a masonry saw of the kind employing a cutter assembly that includes a platform, a prime mover and a cutting tool, the said cutter assembly being mounted on raising and lowering structure in a manner to eliminate the necessity of manually lifting the cutter assembly to change the height adjustment thereof with respect to the work table and the frame that mounts all of the component parts of the machine.

A further object of the present invention is to provide a masonry saw including novel leverage arrangements such as to permit height adjustment, notwithstanding the weight of the cutter assembly and associated parts, all through the medium of a relatively simple, easily actuated screw and follower nut system.

A still further object of the present invention has to do with the provision of novel, readily releasable means for attaching the cutter assembly to the vertically reciprocable support therefor.

It is another important object of the present invention to provide novel cushioning means forming a part of the cutter assembly and yieldably connected with the platform therefor to protect the cutter blade against breakage and damage.

Another important object of the present invention is to provide a lock forming a part of the cushioning means just above set forth to prevent a positive connection between the platform of the cutter assembly and the mechanism for swinging the same on its support.

Figure 1:
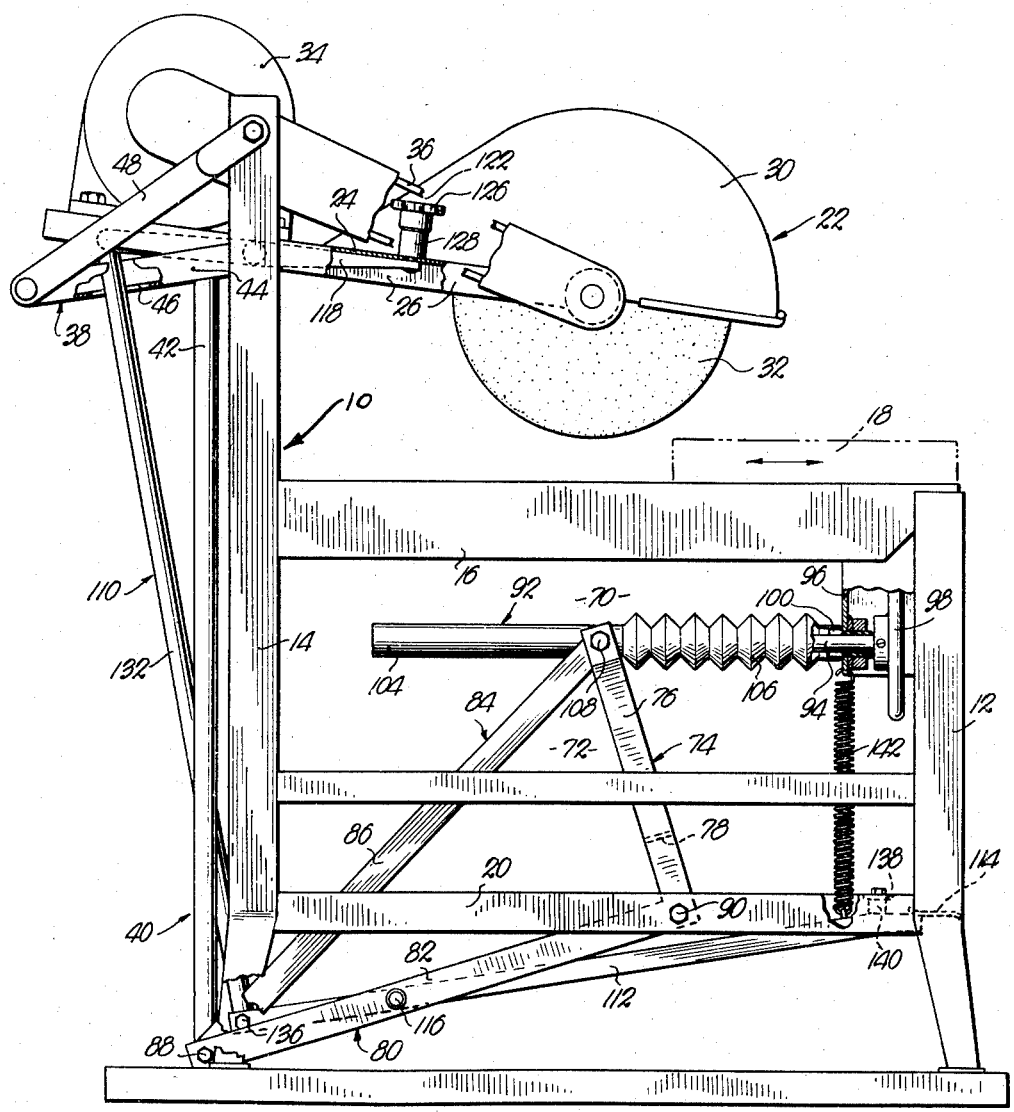
Figure 1 is a side-elevational view of a masonry saw made according to the present invention, parts being broken away and in section for clearness.

A frame broadly designated by the numeral 10 includes a pair of front legs 12 and a pair of longer rear legs 14 all interconnected by an open top pan 16 carrying a horizontally reciprocable work table 18, the latter of which is preferably provided with wood top. Frame 10 includes additionally a pair of longitudinal beams 20 connecting the legs 12 with the legs 14 adjacent the lowermost ends of the legs.

A cutting assembly broadly designated by the numeral 22 includes an elongated platform 24 provided with opposed, longitudinal, downturned flanges 26 to which is secured a panel 28 extending throughout a portion of the length of the platform 24 in spaced relationship to the latter. A protective hood 30 mounted on the platform 24 partially covers a cutting tool 32 in the nature of a masonry saw that is rotatably mounted on platform 24 at the forwardmost end of the latter. A prime mover such as an electric motor 34 is secured to the platform 24 at the opposite end of the latter and is operably coupled with the saw 32 through a continuous belt 36. A recirculating system (not shown) may be provided to direct a coolant to the tool 32, which coolant is collected by the pan 16.

Reciprocable apparatus broadly designated by the numeral 38 is provided for raising and lowering the assembly 22 and which includes a vertically reciprocable standard 40 consisting of a pair of elongated rods 42 that converge relatively as the lowermost ends thereof are approached. A support 44 for the assembly 22, provided with an opening 46, is mounted rigidly to the rods 42 at the uppermost ends of the latter, and is pivotally connected to the uppermost ends of the legs 14 of frame 10 through the medium of linkage 48. The opposite or forwardmost end of the support 44 is provided with a pair of opposed, spaced-apart notches 50 that are slightly inclined and open upwardly. The notches 50 rotatably receive a shaft 52 traversing the platform 24 therebeneath intermediate the ends of the platform 24. Flanges 26 of platform 24 are provided with downwardly facing notches 54 receiving the shaft 52 and the latter is preferably welded directly to the flanges 26.

Notches 50 are formed in arms 56 forming a part of the support 44 and annular grooves 58 are formed in the shaft 52 for receiving the arms 56. L-shaped plates 60 provided with flanges 62 normally underlying the arms 56 are provided to releasably attach the shaft 52 to the support 44. Each of the plates 60 is provided with a circular opening 64 clearing the shaft 52 and plates 60 are swingably mounted on pins 66 carried by the arms 56. Springs 68 on the pins 66 yieldably hold the plates 60 flatly against the outer faces of the arms 56.

Structure for reciprocating the apparatus 38 is broadly designated by the numeral 70 and includes a triangular unit 72 having three spaced-apart corners as best seen in Fig. 1 of the drawings. One side of the unit 72 consists of a substantially A-shaped frame piece 74 having the two relatively diverging legs 76 thereof joined by a crossbar 78. The lowermost side 80 of the frame unit 72 includes a pair of legs 82 rigid to the lowermost ends of the legs 76 and converging as the lowermost and forwardmost ends of the legs 82 are approached. The third side 84 of the unit 72 consists of a pair of links 86 interconnecting the legs 76 and 82. The lowermost ends of the rods 42 of standard 40, the lowermost and forwardmost ends of the legs 82 of side 80 of unit 72, and the lowermost and forwardmost ends of the links 86 of side 84 of unit 72 are all interconnected by a common pivot pin 88 which is therefore disposed at one corner of the triangular frame unit 72. Pivot bolts 90 at another corner of the unit 72 and particularly at the point of joinder between legs 76 and 82 swingably mount the unit 72 on the beams 20.

Manually operable means for swinging the unit 72 is broadly designated by the numeral 92 and includes a rotatable screw element 94 carried by a bracket 96 mounted on the frame 10 adjacent legs 12 below pan 16. Hand wheel 98 and set collar 100 on the screw 94 hold the latter against longitudinal reciprocation and follower means in the nature of a nut 102 is threaded on the screw 94. Screw 94 is protected by a tube 104 on nut 102 and by a collapsible tube 106 between nut 102 and bracket 96. Journals 108 at the third corner of the unit 72 pivotally connect legs 76 and 86 of sides 74 and 84 of unit 72 to the reciprocable nut 102.

Shiftable mechanism broadly designated by the numeral 110 is provided to impart swinging movement to the assembly 22 on the horizontal axis of the shaft 52. Mechanism 110 includes a lever 112 provided with a foot pedal 114 and swingably carried by the mechanism 70, and particularly by the triangular frame unit 72 for swinging movement therewith and with respect thereto. To this end a shaft 116 interconnects the legs 82 of side 80 and it is upon shaft 116 that the lever 112 is swingably mounted.

An elongated member 118 beneath the platform 24 is provided with a hub 120 intermediate the ends thereof journaled on the shaft 52. A bolt 122 at the forwardmost end of the member 118 extends upwardly and loosely through a hole 124 in the platform 24. A cup-shaped nut 126 is threaded on the bolt 122 and is telescoped over a tube 128 secured to the platform 24. A spring 130 coiled about the bolt 122 is housed within the tube 128 and the nut 126.

The opposite or rearmost end of the member 118 is bifurcated to receive the uppermost end of an elongated arm 132 which is pivotally connected to the member 118 by a pintle 134. A suitable fastener 136 pivotally connects the lowermost end of the arm 132 with the forwardmost and normally lowermost end of the lever 112.

A crossbar 138 interconnecting the beams 20 adjacent the legs 12 carries a bumper 140 therebeneath and a spring 142 interconnecting lever 112 and bracket 96 yieldably biases the lever 112 against the bumper 140.

Figure 5:
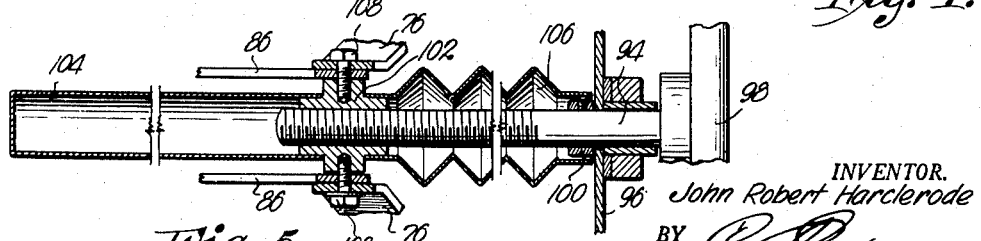
Fig. 5 is an enlarged, longitudinal, fragmentary, cross-sectional view of the manually manipulable parts shown in Figs. 1 and 2 for raising and lowering the cutting assembly.
Figure 2:
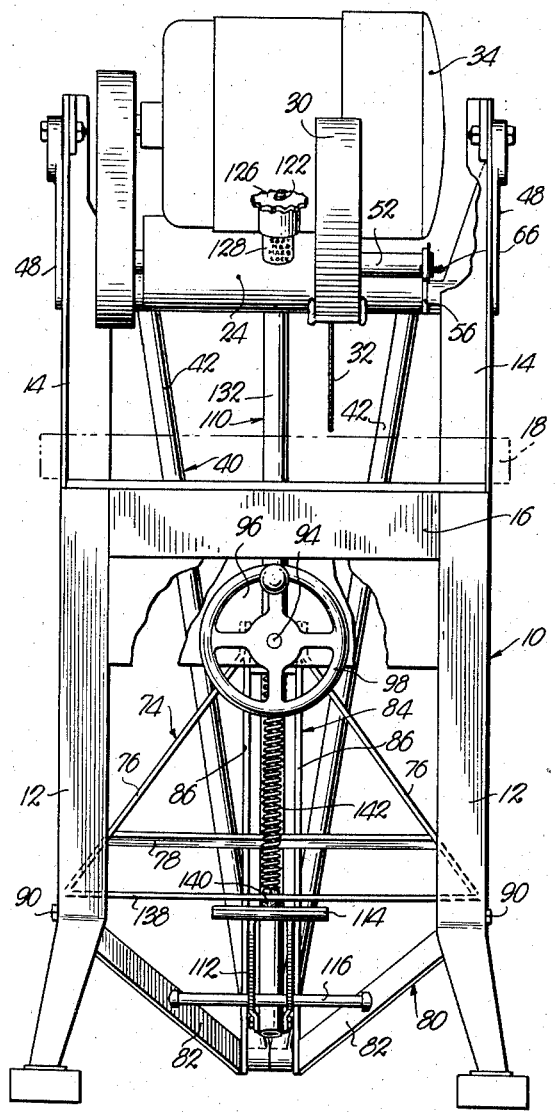
Fig. 2 is a front-elevational view thereof, parts being broken away to reveal details of construction.
Figure 7:
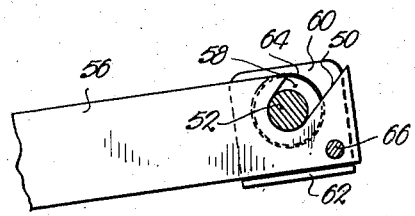
Fig. 7 is a fragmentary view taken on line VII—VII of Fig. 6.
Figure 6:
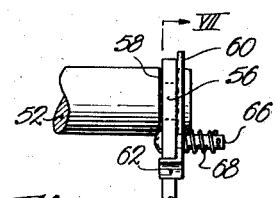
Fig. 6 is an enlarged, fragmentary, detailed, front-elevational view showing one of the releasable means for mounting the platform on its support.
Figure 8:
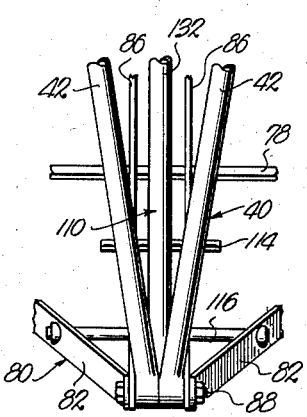
Fig. 8 is a fragmentary, rear-elevational view showing the vertically reciprocable standard, the arm means, a part of the shiftable mechanism, and a portion of the swingable structure for controlling the cutting assembly.
Figure 3:
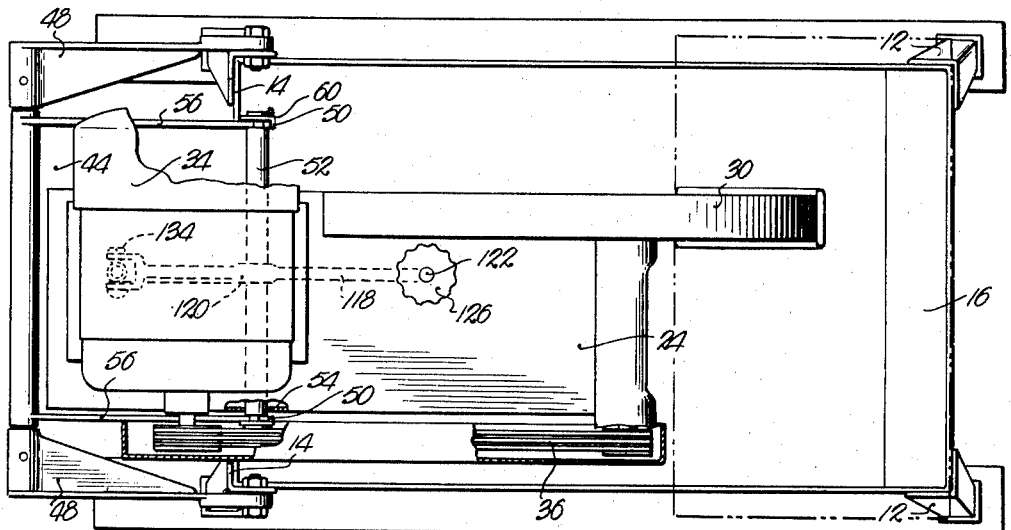
Fig. 3 is a top plan view, parts being broken away for clearness.
Figure 4:
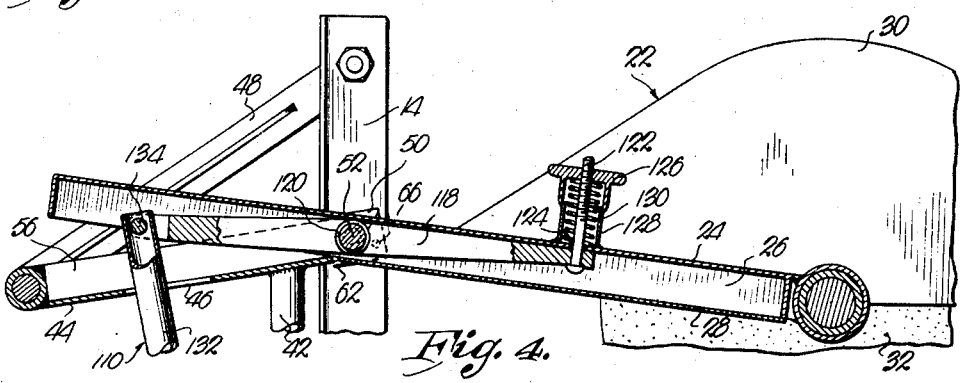
Fig. 4 is an enlarged, side-elevational view fragmentarily showing the cutting assembly and associated parts, partially in section, with the prime mover entirely removed, and showing the platform in an inclined position rather than horizontally disposed as in Fig. 3.

It is noted in Fig. 5 of the drawing that the machine is set with the shiftable device or nut 102 adjacent the outermost end of the rotatable element or screw 94 where the cutting tool 32 is disposed relatively close to the uppermost surface of the work table 18 when the foot lever 112 of the shiftable mechanism 110 is at the uppermost end of its path of travel held against the bumper 140 by the action of spring 142. Consequently, during operation while the work piece is fed into the saw 32 a groove of a predetermined depth is cut into the work piece. The assembly 22 may thereupon be swung about the axis of shaft 52 by depressing the lever 112 when the operator steps on the foot pedal 114, thereby swinging the cutting disc 32 upwardly away from the table 18 and the work piece is retracted. The hand wheel 98 may thereupon be manipulated to rotate screw 94, moving the nut 120 toward the outermost end of screw 94, thereby moving the cutter disc 32 still closer to the table 18 whereby the groove in the work piece is cut still deeper after the lever 112 is released and the work piece again fed to the cutter 32.

It is seen that when the hand wheel 98 is manipulated to rotate screw 94 and receiprocate the nut 102 thereon, the triangular unit 72 of the shiftable structure 70 is swung about the stationary pivot means 90, thereby reciprocating the rod 42 of the reciprocable apparatus 40. This raises and lowers the support 44 and therefore, the entire assembly 22. It is to be noted that the support 44 and the linkage 48 collapse relatively as the nut 102 moves toward the collar 100 and as the standard 42 is moved upwardly by the frame unit 72.

Swinging movement is imparted to the assembly 22 as the lever 112 is swung about the short stub shaft 116 and it is to be noted that the arm means 132 is free to move with respect to the standard 44 within the opening 46 to actuate the member 118 and, therefore, swing the platform 24 about the axis of shaft 52.

In the event a cutting disc 32 is utilized which is not likely to become damaged or broken during use, the nut 126 may be manipulated to lock the member 118 to the platform 24, rendering the spring 130 ineffective. Under such conditions, actuation of the arm means 132 imparts swinging movement to the platform 24 directly through the member 118.

However, when cutting discs 32, of the type which would more likely become damaged if inadvertently wedged in the groove being cut in the work, are employed, the nut 126 may be set to provide limited swinging movement of the member 118 relative to the platform 124. While the spring 142 normally holds the lever 112 against the bumper 140, thereby holding the cutter 32 a predetermined distance from the upper face of table 18, spring 130 will permit limited upward movement of the platform 24 away from the member 118. Therefore, if the disc 32 strikes a relatively hard portion of the work piece or otherwise becomes jammed therewithin, it will readily move upwardly against the tension of spring 130 to prevent damage to the cutter 32. The extent of the tension of spring 130 on the arm 118 of platform 24 is, of course, adjustable by manipulation of the nut 126.

It is to be noted that by virtue of mounting the lever 112 on the legs 82 the shiftable mechanism 110 for swinging the assembly 22 is carried by the shiftable structure 70 and particularly by the frame unit 72 for movement therewith when the hand wheel 98 is adjusted to vary the distance between the disc 32 and the work table 18 while lever 112 is against bumper 140.

The entire assembly 22 including platform 24, disc 32, hood 30, prime mover 34, shaft 52, member 118 and adjusting means 126 may be readily and quickly removed by pulling outwardly on the plates 60 against the action of springs 68. This removes the plates 60 from the shaft 52 and particularly withdraws the flanges 62 from beneath the arms 56, thereby permitting swinging of the plates 60 on the pins 66 out of the way where shaft 52 may be readily slipped upwardly out of the inclined notches 50. The pivot 134 may likewise be readily removable for disconnecting the assembly 22 from the arm of 132.

Figure 9:
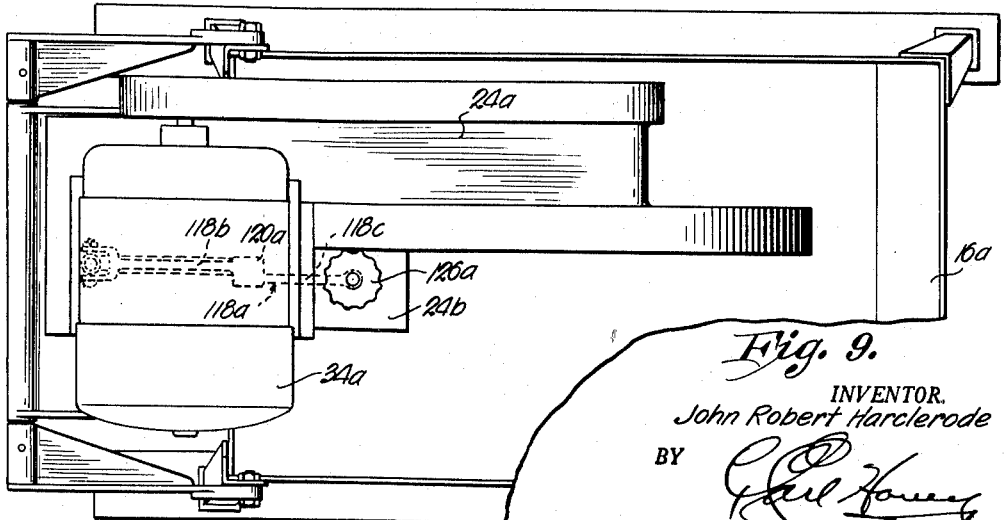
Fig. 9 is a fragmentary plan view similar to Fig. 3 illustrating a slightly modified form of the invention.

The modification of my invention shown in Fig. 9 of the drawings is substantially the same as that illustrated in Figs. 1 to 8, inclusive, with the exception only that the cutter disc is driven from the opposite side of prime mover 34a. To this end, platform 24a is provided with a small portion 24b accommodating adjusting nut 126a. Additionally, the elongated member 118a is provided with a pair of oppositely extending lengths 118b and 118c that are offset with respect to hub 120a to which they are rigidly secured. It is seen, therefore, in Fig. 9 that platform 24a is substantially clear of the work piece to be cut or grooved on a work table carried by pan 16a.

Having thus described the invention, what is claimed as new and desired to be secured by Letters Patent is:

1. In a cutting machine, a frame; a vertically reciprocable standard having a support secured to the uppermost end thereof; means pivotally interconnecting the support and the frame; a cutting assembly; means swingably mounting the assembly on said support; structure having means pivotally mounting the same on the frame for swinging movement relative to the frame; means pivotally connecting said structure with the lowermost end of said standard; a device shiftable on the frame and pivotally connected with said structure for swinging the structure to reciprocate said standard and thereby raise and lower the cutting assembly; mechanism swingably mounted on said structure for movement therewith; and means operably coupling said mechanism with the assembly for swinging the latter.

2. In a cutting machine, a frame; a work table mounted on the frame; a vertically reciprocable standard having a support secured to the uppermost end thereof; linkage pivotally connecting one end of the support with said frame; a cutting assembly provided with a cutting tool; means swingably mounting the assembly on the opposite end of the support for swinging movement of said cutting tool toward and away from the work table; structure having means pivotally mounting the same on the frame for swinging movement relative to the frame; means pivotally connecting said structure with the lowermost end of said standard; a device, shiftable on the frame and pivotally connected with said structure for swinging the structure to reciprocate said standard and thereby raise and lower the cutting assembly; mechanism swingably mounted on said structure for movement therewith; and means operably coupling said mechanism with the assembly for swinging the latter.

3. In a cutting machine, a frame; a work table mounted on the frame; a vertically reciprocable standard having a support secured to the uppermost end thereof; linkage pivotally connecting one end of the support with said frame; a cutting assembly provided with a cutting tool; means swingably mounting the assembly on the opposite end of the support for swinging movement of said cutting tool toward and away from the work table; structure having means pivotally mounting the same on the frame for swinging movement relative to the frame; means pivotally connecting said structure with the lowermost end of said standard; a device, shiftable on the frame and pivotally connected with said structure for swinging the structure to reciprocate said standard and thereby shift the cutting assembly toward and away from said work table; a foot lever swingably mounted on said structure for swinging movement therewith; and arm means pivotally interconnecting the lever and said assembly for swinging the latter relative to the support.

4. In a cutting machine, a frame; a work table mounted on the frame; a vertically reciprocable standard having a support secured to the uppermost end thereof; linkage pivotally connecting one end of the support with said frame; a cutting assembly provided with a cutting tool; means swingably mounting the assembly on the opposite end of the support for swinging movement of said cutting tool toward and away from the work table; structure having means pivotally mounting the same on the frame for swinging movement relative to the frame; means pivotally connecting said structure with the lowermost end of said standard; an element rotatably carried by the frame; reciprocable follower means on the element; means pivotally connecting said follower means with said structure for swinging the structure to reciprocate said standard and thereby shift the cutting assembly toward and away from said work table upon actuation of said element; a foot lever swingably mounted on said structure for swinging movement therewith; and arm means pivotally interconnecting the lever and said assembly for swinging the latter relative to the support.

5. A machine of the kind described comprising a frame; a work table mounted on the frame; a vertically reciprocable standard having a support secured to the uppermost end thereof; linkage pivotally connecting one end of the support with said frame; a platform having a rotatable masonry saw on one end thereof and a prime mover on the opposite end thereof operably coupled with said saw; means swingably mounting the platform, intermediate the ends thereof, on the opposite end of the support for swinging movement of said saw toward and away from the work table; a member beneath the platform and swingably secured intermediate the ends thereof to said opposite end of the support; resilient means interconnecting one end of said member with the platform for yieldably limiting the extent of swinging movement of the latter relative to the member; structure having means pivotally mounting the same on the frame for swinging movement relative to the frame; means pivotally connecting said structure with the lowermost end of said standard; an element rotatably carried by the frame; reciprocable follower means on the element; means pivotally connecting said follower means with said structure for swinging the structure to reciprocate said standard and thereby shift the platform toward and away from said work table upon actuation of said element; a foot lever swingably mounted on said structure for swinging movement therewith; arm means pivotally interconnecting the lever and the opposite end of said member for swinging the latter relative to the support upon swinging of the lever relative to the structure; and resilient means connecting the lever with said frame for biasing the lever toward one end of its path of travel to yieldably maintain the saw swung away from the work table.

6. A machine of the kind described comprising a frame; a work table mounted on the frame; a vertically reciprocable standard having a support secured to the uppermost end thereof; linkage pivotally connecting one end of the support with said frame; a platform having a rotatable masonry saw on one end thereof and a prime mover on the opposite end thereof operably coupled with said saw; means mounting the platform, intermediate the ends thereof, on the opposite end of the support; structure having means pivotally mounting the same on the frame for swinging movement relative to the frame; means pivotally connecting said structure with the lowermost end of said standard; an element rotatably carried by the frame; reciprocable follower means on the element; and means pivotally connecting said follower means with said structure for swinging the structure to reciprocate said standard and thereby shift the platform toward and away from said work table upon actuation of said element.

7. A machine of the kind described comprising a frame; a work table mounted on the frame; a vertically reciprocable standard having a support secured to the uppermost end thereof; linkage pivotally connecting one end of the support with said frame; a platform having a rotatable masonry saw on one end thereof and a prime mover on the opposite end thereof operably coupled with said saw; means mounting the platform, intermediate the ends thereof, on the opposite end of the support; structure having means pivotally mounting the same on the frame for swinging movement relative to the frame; means pivotally connecting said structure with the lowermost end of said standard; and an element pivotally connected with said structure for swinging the structure to reciprocate said standard and thereby shift the platform toward and away from said work table upon actuation of said element.

8. A machine of the kind described comprising a frame; a work table mounted on the frame; a vertically reciprocable standard having a support secured to the uppermost end thereof; linkage pivotally connecting one end of the support with said frame; a platform having a rotatable masonry saw on one end thereof and a prime mover on the opposite end thereof operably coupled with said saw; readily releasable means swingably mounting the platform, intermediate the ends thereof, on the opposite end of the support for swinging movement of said saw toward and away from the work table; a member beneath the platform and swingably secured intermediate the ends thereof to the platform; resilient means interconnecting one end of said member with the platform for yieldably limiting the extent of swinging movement of the latter relative to the member; means connected to the lowermost end of the standard for reciprocating the latter to raise and lower the platform; and means connected with the opposite end of the member for swinging the latter to move the saw toward and away from the table.

9. A machine of the kind described comprising a frame; a work table mounted on the frame; a vertically reciprocable standard having a support secured to the uppermost end thereof; linkage pivotally connecting one end of the support with said frame; a platform having a rotatable masonry saw on one end thereof and a prime mover on the opposite end thereof operably coupled with said saw; means swingably mounting the platform, intermediate the ends thereof, on the opposite end of the support for swinging movement of said saw toward and away from the work table; a member beneath the platform and swingably secured intermediate the ends thereof to the platform; resilient means interconnecting one end of said member with the platform for yieldably limiting the extent of swinging movement of the latter relative to the member; readily releasable means for locking the member to the platform for swinging movement therewith; means connected to the lowermost end of the standard for reciprocating the latter to raise and lower the platform; and means connected with the opposite end of the member for swinging the latter to move the saw toward and away from the table.

10. A machine of the kind described, a cutter assembly; a frame for supporting said cutter assembly; structure for raising and lowering said cutter assembly including a crank member, fulcrum means mounting said crank member on the frame for vertical swinging movement about a fixed, horizontal axis whereby one end of the crank member moves through an arc concentric with said fulcrum means, a standard extending upwardly from said crank member, pintle means at said one end of the crank member connecting the latter with the standard, means connecting the standard with the frame for swinging movement of the standard relative to the crank member about said pintle means as the crank member is swung about said fulcrum means to raise and lower the standard; and means mounting the cutter assembly on the standard.

11. A machine of the kind described, a cutter assembly; a frame for supporting said cutter assembly; structure for raising and lowering said cutter assembly including a crank member, fulcrum means mounting said crank member on the frame for vertical swinging movement about a fixed, horizontal axis whereby one end of the crank member moves through an arc concentric with said fulcrum means, a standard extending upwardly from said crank member, pintle means at said one end of the crank member connecting the latter with the standard, means connecting the standard with the frame for swinging movement of the standard relative to the crank member about said pintle means as the crank member is swung about said fulcrum means to raise and lower the standard; shaft means mounting the cutter assembly on the standard for swinging movement of the cutter assembly relative to the standard about a horizontal axis; and push-pull arm means coupled with said cutter assembly for swinging the latter about the shaft means.

12. A machine of the kind described, a cutter assembly; a frame for supporting said cutter assembly; structure for raising and lowering said cutter assembly including a crank member, fulcrum means mounting said crank member on the frame for vertical swinging movement about a fixed, horizontal axis whereby one end of the crank member moves through an arc concentric with said fulcrum means, a standard extending upwardly from said crank member, pintle means at said one end of the crank member connecting the latter with the standard, means connecting the standard with the frame for swinging movement of the standard relative to the crank member about said pintle means as the crank member is swung about said fulcrum means to raise and lower the standard; shaft means mounting the cutter assembly on the standard for swinging movement of the cutter assembly relative to the standard about a horizontal axis; lever means for swinging the cutter assembly; pivot means intermediate the ends of said lever means mounting the same for swinging movement about said pivot means; and means connecting the lever means with said cutter assembly for swinging the latter about the shaft means as the lever means is swung about said pivot means, said crank member supporing the pivot means for vertical swinging movement of the latter therewith as the crank member is swung about said fulcrum means.

13. A machine of the kind described, a cutter assembly; a frame for supporting said cutter assembly; structure for raising and lowering said cutter assembly including a bell crank member having a pair of arms disposed to form substantially a right angle therebetween, fulcrum means at the apex of said angle mounting said bell crank member on the frame for vertical swinging movement about a fixed, horizontal axis whereby one end of one of said arms of the bell crank member moves through an arc concentric with said fulcrum means, a standard extending upwardly from said one arm of the bell crank member, pintle means at said one end of said one arm of the bell crank member connecting the one arm with the standard, means connecting the standard with the frame for swinging movement of the standard relative to the bell crank member about said pintle means as the bell crank member is swung about said fulcrum means to raise and lower the standard; shaft means mounting the cutter assembly on the standard for swinging movement of the cutter assembly relative to the standard about a horizontal axis; lever means for swinging the cutter assembly; pivot means intermediate the ends of said lever means mounting the same for swinging movement about said pivot means; and means connecting the lever means with said cutter assembly for swinging the latter about the shaft means as the lever means is swung about said pivot means, said one arm of the bell crank member supporting the pivot means for vertical swinging movement of the latter therewith as the bell crank member is swung about said fulcrum means.

14. A machine of the kind described, a cutter assembly; a frame for supporting said cutter assembly; structure for raising and lowering said cutter assembly including a bell crank member having a pair of arms disposed to form substantially a right angle therebetween, fulcrum means at the apex of said angle mounting said bell crank member on the frame for vertical swinging movement about a fixed, horizontal axis whereby one end of one of said arms of the bell crank member moves through an arc concentric with said fulcrum means, a standard extending upwardly from said one arm of the bell crank member, pintle means at said one end of said one arm of the crank member connecting the one arm with the standard, means connecting the standard with the frame for swinging movement of the standard relative to the bell crank member about said pintle means as the bell crank member is swung about said fulcrum means to raise and lower the standard; means mounting the cutter assembly on the standard; manually manipulable means carried by the frame for swinging the bell crank member about said fulcrum means; and means connecting the manually manipulable means with the other of said arms of the bell crank member.

15. A machine of the kind described, a cutter assembly; a frame for supporting said cutter assembly; structure for raising and lowering said cutter assembly including a crank member, fulcrum means mounting said crank member on the frame for vertical swinging movement about a fixed, horizontal axis, a standard extending upwardly from said crank member; means connecting the crank member with the standard whereby the latter is raised and lowered as the crank member is swung about said fulcrum means; means connecting the standard with the frame for guiding the standard as the latter is raised and lowered; shaft means mounting the cutter assembly on the standard for swinging movement of the cutter assembly relative to the standard about a horizontal axis; lever means for swinging the cutter assembly; pivot means intermediate the ends of said lever means mounting the same for swinging movement about said pivot means; and means connecting the lever means with said cutter assembly for swinging the latter about the shaft means as the lever means is swung about said pivot means, said crank member supporting the pivot means for vertical swinging movement of the latter therewith as the crank member is swung about said fulcrum means.

16. A machine of the kind described, a cutter assembly; a frame for supporting said cutter assembly; structure for raising and lowering said cutter assembly including a crank member, fulcrum means mounting said crank member on the frame for vertical swinging movement about a fixed, horizontal axis whereby one end of the crank member moves through an arc concentric with said fulcrum means, a standard extending upwardly from said crank member, pintle means at said one end of the crank member connecting the latter with the standard, vertically swingable linkage pivotally connecting the standard with the frame for swinging movement of the standard relative to the crank member about said pintle means as the crank member is swung about said fulcrum means to raise and lower the standard; and means mounting the cutter assembly on the standard.

17. A machine of the kind described, a cutter assembly; a frame for supporting said cutter assembly; structure for raising and lowering said cutter assembly including a bell crank member having a pair of arms disposed to form substantially a right angle therebetween, fulcrum means at the apex of said angle mounting said bell crank member on the frame for vertical swinging movement about a fixed, horizontal axis whereby one end of one of said arms of the bell crank member moves through an arc concentric with said fulcrum means, a standard extending upwardly from said one arm of the bell crank member, pintle means at said one end of said one arm of the crank member connecting the one arm with the standard, means connecting the standard with the frame for swinging movement of the standard relative to the bell crank member about said pintle means as the bell crank member is swung about said fulcrum means to raise and lower the standard; means mounting the cutter assembly on the standard; a hand wheel rotatably mounted on the frame for swinging the bell crank member about said fulcrum means; and means operably connecting the hand wheel with the other of said arms of the bell crank member.

References Cited in the file of this patent
UNITED STATES PATENTS

| | | |
|---|---|---|
| 2,171,024 | Coates | Aug. 29, 1939 |
| 2,180,743 | Martin | Nov. 21, 1939 |
| 2,514,826 | Zuzelo | July 11, 1950 |
| 2,581,777 | Wright | Jan. 8, 1952 |
| 2,591,206 | Scott | Apr. 1, 1952 |
| 2,682,262 | Schultz | June 29, 1954 |